Jan. 3, 1950 R. McCOY 2,493,496
FOOD GRATER HAVING ROTARY DRUM
Filed Nov. 14, 1945 2 Sheets-Sheet 1
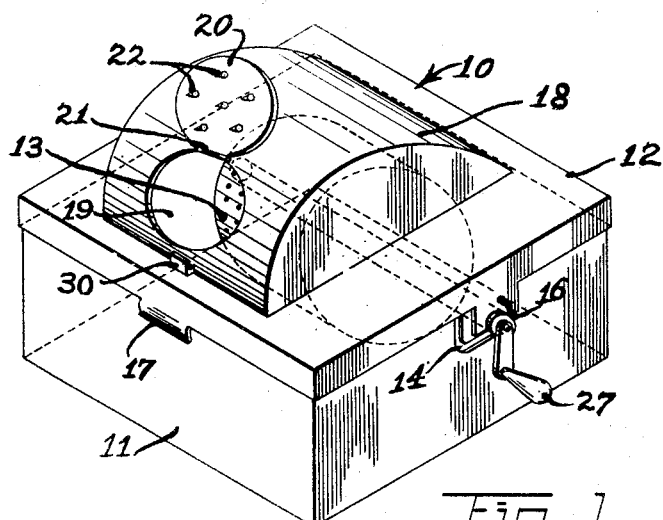
Fig-1-
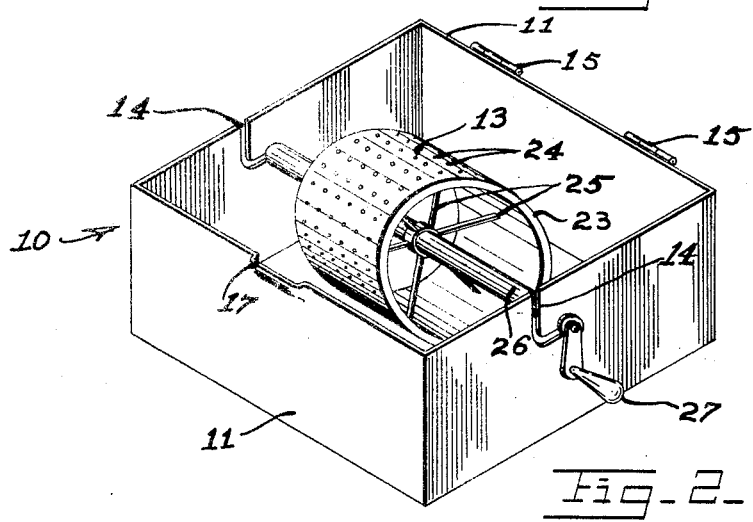
Fig-2-
Fig-3-
INVENTOR
Robert McCoy
BY
ATTORNEY Jan. 3, 1950          R. McCOY          2,493,496
FOOD GRATER HAVING ROTARY DRUM
Filed Nov. 14, 1945          2 Sheets-Sheet 2
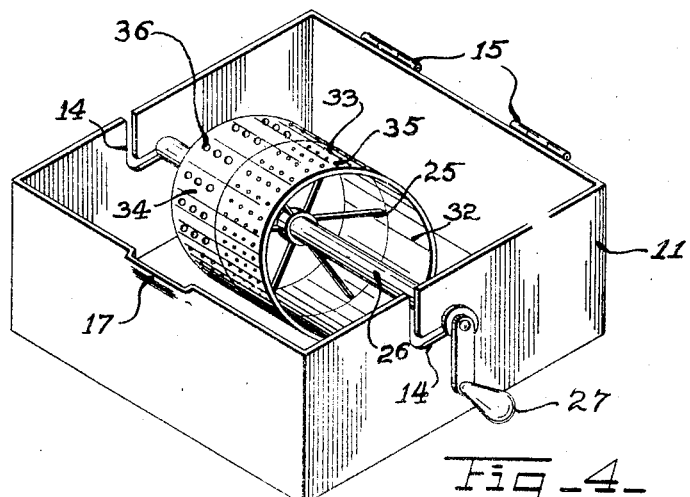
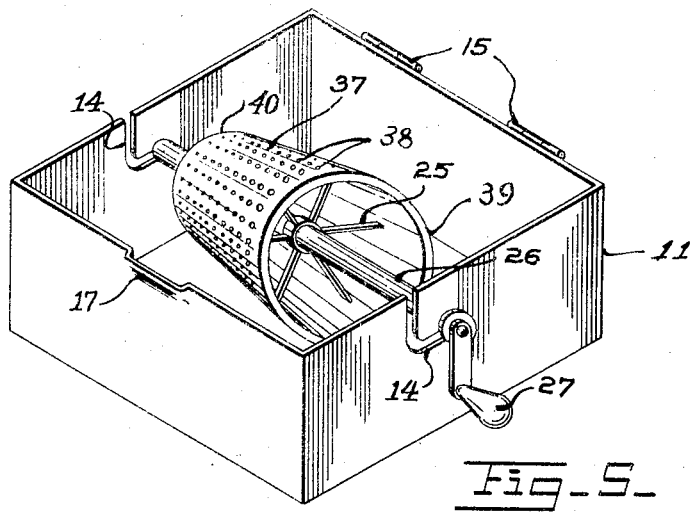
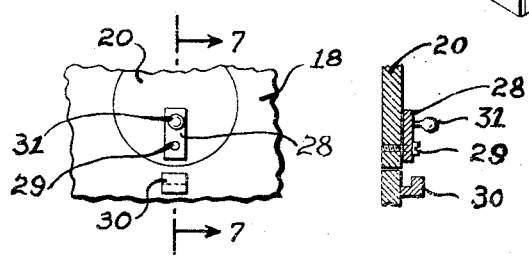
INVENTOR
Robert McCoy
BY
ATTORNEY Patented Jan. 3, 1950

2,493,496

UNITED STATES PATENT OFFICE 2,493,496

FOOD GRATER HAVING ROTARY DRUM

Robert McCoy, New York, N. Y.

Application November 14, 1945, Serial No. 628,402

3 Claims. (Cl. 146—177)

This invention relates to grating devices to be used for grating cheese, dried bread, vegetables and the like, and more specifically to a type of grater enclosed in a container and operated by a hand crank.

Graters of the conventional home type are dangerous as there is no protection for the hand, and the larger types of grater used in restaurants are generally complicated and costly machines not suited for home use.

An object of my invention is to form a home type grater with the abrading surface enclosed in order to protect the user.

Another object is to form a simple type of grater in which the grating surface can be completely enclosed, and so remain clean and free from dirt and dust when not in use.

A further object is to form a grater which can be easily taken apart and cleaned, and simply and quickly re-assembled.

Another object is to provide a grater in which the material to be grated can be fed either directly by hand or by an intermediate agent to the grating surface.

A further object is to form a grater with both coarse and fine grating surfaces.

A still further object is to form an inexpensive, simple, and safe grating device.

I accomplish these and other objects by forming my grater of a box like structure, and inserting therein a rotatable cylinder having a grating surface, and further providing motivating means for turning the cylinder from outside the box. In addition, I provide a hinged holding element positioned so that it can be brought near the rotating grater, and capable of retaining the material while being grated.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of my grating device with the cover on and ready for use, according to one form of my invention.

Fig. 2 is a perspective view of the device shown in Fig. 1 with the cover removed, revealing the interior.

Fig. 3 is an enlarged detail of one of the ears in the cover portion.

Fig. 4 is a perspective view of a modification of my grating device, with the cover portion removed showing a grating member with grating means in sections of different finenesses.

Fig. 5 is a perspective view of another modification of the grating device, with the cover portion removed showing a truncated-cone shaped grating member with grating means varying from end to end of the cone so that a gradation in finenesses in grating can be secured.

Fig. 6 is a fragmentary detail of part of the cover and hinged door.

Fig. 7 is a section along the line 7—7 of Fig. 6.

In the drawings and specifications, in which like reference numbers designate similar parts, in the preferred form of my invention shown in Figs. 1 to 3 inclusive, the grating device 10 is comprised of a box 11, a cover portion 12 and a cylindrical rotatable grating member 13. The box has two oppositely placed L-shaped slots 14. The cover portion is pivotally joined to the box by hinges 15 and has two ears 16 fitting over the slots 14 in the box 11 and a locking means 17. A superstructure 18 on the cover portion 12 has an opening 19 therein and a door 20 pivotally joined to the superstructure at its opening by a hinge 21 which permits the door to swing through the opening.

The door has a multiplicity of projections 22 on its inner face. The grating member is a cylinder 23 with grating means 24 and is firmly braced by ribs 25 joining it to a crankshaft 26 journaled in 14 of the slots in the box and the ears in the cover portion. The crankshaft has a handle portion 27.

The outside face of the door 20 of the superstructure is provided with a catch formed of a tongue 28 rotatably secured to the door by a screw 29 and a hook or shoulder 30 secured to the superstructure. A handle or knob 31 is provided on the tongue for its easy manipulation.

In the modification of my invention shown in Fig. 4, the grating member 32 is divided into two sections 33 and 34 having grating means 35 and 36 of different finenesses.

Another modification of my invention is shown in Fig. 5, where the grating member 37 is in the form of a truncated cone having grating means formed by holes 38 having ragged edges projecting outwardly, the size of the holes and the distances between them diminishing from one end 39 of the cone to the other end 40.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letter Patent is:

1. In a food grater having a box formed with spaced end walls and an open top and enclosing a grating member mounted on a crankshaft which is longer than the distance between the end walls and a pivotally mounted cover for closing the open top, the end walls being formed with aligned L-shaped slots, each of said L-shaped slots having a vertical arm opening through the top edge of the respective side wall and which continues at its bottom end into a horizontal arm, whereby the grating member can be rotatively supported between the end walls by first passing the ends of the crankshaft downward through said vertical arms and then horizontally rearward to the rear ends of said horizontal arms, and means on the cover engaging the ends of the crankshaft in the closed position of the cover for rotatively retaining the crankshaft in position between the rear ends of the horizontal arms of said L-shaped slots.

2. In a food grater having a box formed with spaced end walls and an open top and enclosing a grating member mounted on a crankshaft which is longer than the distance between the end walls and a pivotally mounted cover for closing the open top, the end walls being formed with aligned L-shaped slots, each of said L-shaped slots having a vertical arm opening through the top edge of the respective side wall and which continues at its bottom end into a horizontal arm, whereby the grating member can be rotatively supported between the end walls by first passing the ends of the crankshaft downward through said vertical arms and then horizontally rearward to the rear ends of said horizontal arms, and means on the cover engaging the ends of the crankshaft in the closed position of the cover for rotatively retaining the crankshaft in position between the rear ends of the horizontal arms of said L-shaped slots, said horizontal arms having their rear ends located on substantially a horizontal axis extended centrally through the end walls.

3. In a food grater having a box formed with spaced end walls and an open top and enclosing a grating member mounted on a crankshaft which is longer than the distance between the end walls and a pivotally mounted cover for closing the open top, the end walls being formed with aligned L-shaped slots, each of said L-shaped slots having a vertical arm opening through the top edge of the respective side wall and which continues at its bottom end into a horizontal arm, whereby the grating member can be rotatively supported between the end walls by first passing the ends of the crankshaft downward through said vertical arms and then horizontally rearward to the rear ends of said horizontal arms, and means on the cover engaging the ends of the crankshaft in the closed position of the cover for rotatively retaining the crankshaft in position between the rear ends of the horizontal arms of said L-shaped slots, said means comprising ears depending from the cover along the outer faces of the end walls, said ears being formed at their bottom ends with semi-circular notches to seat over the tops of the ends of the crankshaft when located at the rear ends of the horizontal arms when the cover is pivoted to a position closing the open top of the box.

ROBERT McCOY.

REFERENCES CITED

The following references are of record in the file of this patent:

UNITED STATES PATENTS

| Number | Name | Date |
| --- | --- | --- |
| 185,184 | Markey et al. | Dec. 12, 1876 |
| 959,210 | Garvelek | May 24, 1910 |
| 706,837 | Lucas | Aug. 12, 1902 |
| 959,210 | Fischer | May 24, 1910 |
| 1,205,052 | Spencer et al. | Nov. 14, 1916 |
| 1,677,448 | Hopkins | July 17, 1928 |

FOREIGN PATENTS

| Number | Country | Date |
| --- | --- | --- |
| 113,656 | Germany | Sept. 29, 1900 |
| 583,015 | Germany | Aug. 26, 1933 |